US008988374B2

(12) United States Patent
Weng et al.

(10) Patent No.: US 8,988,374 B2
(45) Date of Patent: Mar. 24, 2015

(54) INTERACTIVE-TYPE DISPLAY WINDOW DEVICE

(75) Inventors: Derchin Weng, Taipei (TW); Che-Ming Chang, Taipei (TW); Ying-Hung Lin, Taipei (TW)

(73) Assignee: Promate Solutions Corporation, Taipei (TW)

( * ) Notice: Subject to any disclaimer, the term of this patent is extended or adjusted under 35 U.S.C. 154(b) by 387 days.

(21) Appl. No.: 13/546,601

(22) Filed: Jul. 11, 2012

(65) Prior Publication Data

US 2014/0015762 A1 Jan. 16, 2014

(51) Int. Cl.

*G06F 3/041* (2006.01)
*G07F 9/02* (2006.01)
*H05B 37/02* (2006.01)

(52) U.S. Cl.

CPC .............. *H05B 37/029* (2013.01); *G07F 9/023* (2013.01)
USPC ......... 345/173; 345/179; 178/18.01; 235/381

(58) Field of Classification Search

CPC .... G06F 3/0488; G06F 3/04883; G06F 3/044
USPC .................... 345/173–179; 178/18.01–18.04; 235/381
See application file for complete search history.

(56) References Cited

U.S. PATENT DOCUMENTS

| | | | | | |
|---|---|---|---|---|---|
| 4,875,032 | A | * | 10/1989 | McManus et al. | 345/603 |
| 5,479,186 | A | * | 12/1995 | McManus et al. | 345/11 |
| 7,040,535 | B2 | * | 5/2006 | Sato et al. | 235/381 |
| 2005/0150948 | A1 | * | 7/2005 | Sato et al. | 235/381 |
| 2011/0032203 | A1 | * | 2/2011 | Pryor | 345/173 |
| 2014/0019311 | A1 | * | 1/2014 | Tanaka | 705/27.2 |

* cited by examiner

*Primary Examiner* — Kimnhung Nguyen
(74) *Attorney, Agent, or Firm* — Muncy, Geissler, Olds & Lowe, P.C.

(57) ABSTRACT

An interactive-type display window device comprises a receiving unit, a light-pervious panel, at least one sensor, at least a lighting module, and a processing unit. The receiving unit is provided with at least one display shelf for placing display commodities thereon. The light-pervious panel is provided on a front surface of the receiving unit and can be a transparent display panel with a touch control area. Each sensor is a photo sensor or a proximity sensor. Each lighting module is provided within the receiving unit for emitting light onto the display commodities. The processing unit is used for controlling the lighting module according to the sensor's detection results or the consumers' preference. Thereby, it is able to adjust the luminous intensity, luminous chromaticity, luminous color temperature, luminous frequency spectrum, and/or the rotation of the lighting module in order to achieve the desired luminous design.

16 Claims, 6 Drawing Sheets

INTERACTIVE-TYPE DISPLAY WINDOW DEVICE

TECHNICAL FIELD

The present invention relates to a display window device and, more particularly, to an interactive-type display window device provided with at least one sensor and/or transparent display panel with or without a touch control panel, by which it is able to adjust the luminous intensity, luminous chromaticity, luminous color temperature, luminous frequency spectrum, and/or the rotation of the lighting module according to the detection results of the sensor or the preference of consumers and to display the information regarding the display commodities to the consumers to achieve the purposes of advertisement and promotion.

BACKGROUND

In department stores, common markets, or supermarkets, commodities are commonly displayed in the display window of the stores to attract the attention of the consumers in order to advertise or promote these commodities. In addition to being placed in above conventional display window, commodities also can be placed in various vending machines for sale. In this case, these commodities can be displayed as in the display window for consumers to purchase them directly.

In order to display the commodities to attract the consumers' attention, a conventional display window device (that could be one of the display windows in stores or of various vending machines) is provided with a front panel (such as glass) on the front surface thereof. Besides, the display window device is also disposed with a fixed lighting module therein. The fixed lighting module is used to emitting light directly onto the display commodities. Moreover, some display window devices are also provided with a liquid crystal display in order to show relevant information of advertisement and promotion to consumers.

However, the conventional display window device has following disadvantages:

First of all, the luminous design for the display window should be altered when different kinds of commodities are displayed. Under this consideration, customization is required to make a desired luminous design according to the specific kinds of displayed commodities. Thereby, the display window device with a particular luminous design is only suitable for displaying certain specific kinds of commodities, which limits the use thereof. Moreover, customization increases the manufacturing cost as well.

Secondly, even the luminous design for the display window is customized according to the kinds of the display commodities, the luminous effect may be impaired when the positions of certain commodities are changed. Besides, when some commodities are removed as a result of certain reasons (such as being purchased and not replaced with new ones), the left empty space will also impair the customized luminous effect.

Furthermore, although the use of the liquid crystal display can achieve the purposes of advertisement and promotion, it is still disadvantageous. Because the liquid crystal display is designed to play the predetermined contents, it is unable to interact with the consumers and these contents may not attract the consumers' attention anymore after being played for a period of time.

In order to overcome above shortcomings, inventor had the motive to study and develop the present invention to provide an interactive-type display window device, by which it is able to adjust the luminous intensity, luminous chromaticity, luminous color temperature, luminous frequency spectrum, and/or the rotation of the lighting module according to the detection results of the sensor or the preference of the consumers and to display the information regarding the display commodities to the consumers to achieve the purposes of advertisement and promotion.

SUMMARY OF THE DISCLOSURE

An object of the present invention is to provide an interactive-type display window device provided with at least one sensor (such as a photo sensor or a proximity sensor) and/or rotatable lighting module, so that it is able to adjust the luminous intensity, luminous chromaticity, luminous color temperature, luminous frequency spectrum, and/or the rotation of the lighting module according to the detection results of the sensor in order to obtain the optimal luminous effect for the display commodities.

Another object of the present invention is to provide an interactive-type display window device provided with at least one sensor (such as a photo sensor or a proximity sensor), a transparent display panel, and rotatable lighting module, so that it is able to determine whether the information regarding the display commodities should be displayed and to adjust the luminous intensity, luminous chromaticity, luminous color temperature, luminous frequency spectrum, and/or the rotation of the lighting module according to the detection results of the sensor in order to obtain the optimal luminous effect for the display commodities and the transparent display panel.

Another object of the present invention is to provide an interactive-type display window device provided with a transparent display panel having a touch control area and rotatable lighting module, so that it is able for customers to display the information regarding the display commodities via the touch control area according to the consumers' preference and to adjust the luminous intensity, luminous chromaticity, luminous color temperature, luminous frequency spectrum, and/or the rotation of the lighting module in order to obtain the optimal luminous effect relative to the vision of the consumers.

In order to achieve above objects, the present invention provides an interactive-type display window device comprises a receiving unit, a light-pervious panel, at least one sensor, at least one lighting module, and a processing unit, where the receiving unit is provided with at least one display shelf for placing display commodities thereon; the light-pervious panel is provided on a front surface of the receiving unit; the at least one sensor is at least one photo sensor and/or at least one proximity sensor, in which each photo sensor is used to detect the lighting environment inside or outside the receiving unit, while each proximity sensor is used to detect whether any consumer is approaching the receiving unit; the at least one lighting module is provided within the receiving unit for emitting light onto the display commodities on the at least one display shelf; and the processing unit is electrically connected with the at least one sensor and the at least one lighting module for receiving the detection results from the sensor and adjusting the luminous intensity, luminous chromaticity, luminous color temperature, and/or luminous frequency spectrum of the light source in the lighting module.

The present invention provides also provides another interactive-type display window device comprises a receiving unit, a transparent display panel, at least one lighting module, and a processing unit, where the receiving unit is provided with at least one display shelf for placing display commodities thereon; the transparent display panel is provided on a front surface of the receiving unit for displaying information regarding the display commodities and provided with a touch control area; the at least one lighting module is provided within the receiving unit for emitting light onto the display commodities on the at least one display shelf; and the processing unit is used for adjusting the luminous intensity, luminous chromaticity, luminous color temperature, and/or luminous frequency spectrum of the light source in the lighting module; thereby, the touch control area is used for consumers to control the information display and/or to control the processing unit to adjust the luminous intensity, luminous chromaticity, luminous color temperature, and/or luminous frequency spectrum of the light source therein.

In implementation, the lighting module is rotatable and the processing unit is capable of controlling the rotation of the lighting module according to the detection results in order to alter the radiation angle of the light source.

In implementation, each lighting module includes a casing, a light source, and a light regulator, where the casing is rotatable under the control of the processing unit; the light source is provided in the casing; and the light regulator is connected to the casing for covering the light source. Alternatively, each lighting module includes a casing, a light source, and a light regulator, where the casing is fixed in the receiving unit; the light source is provided in the casing; and the light regulator is connected to the casing for covering the light source and rotatable under the control of the processing unit.

In implementation, the light regulator is a lens, a covering, or a light control plate.

The following detailed description, given by way of examples or embodiments, will best be understood in conjunction with the accompanying drawings.

DETAILED DESCRIPTION

Figure 1:
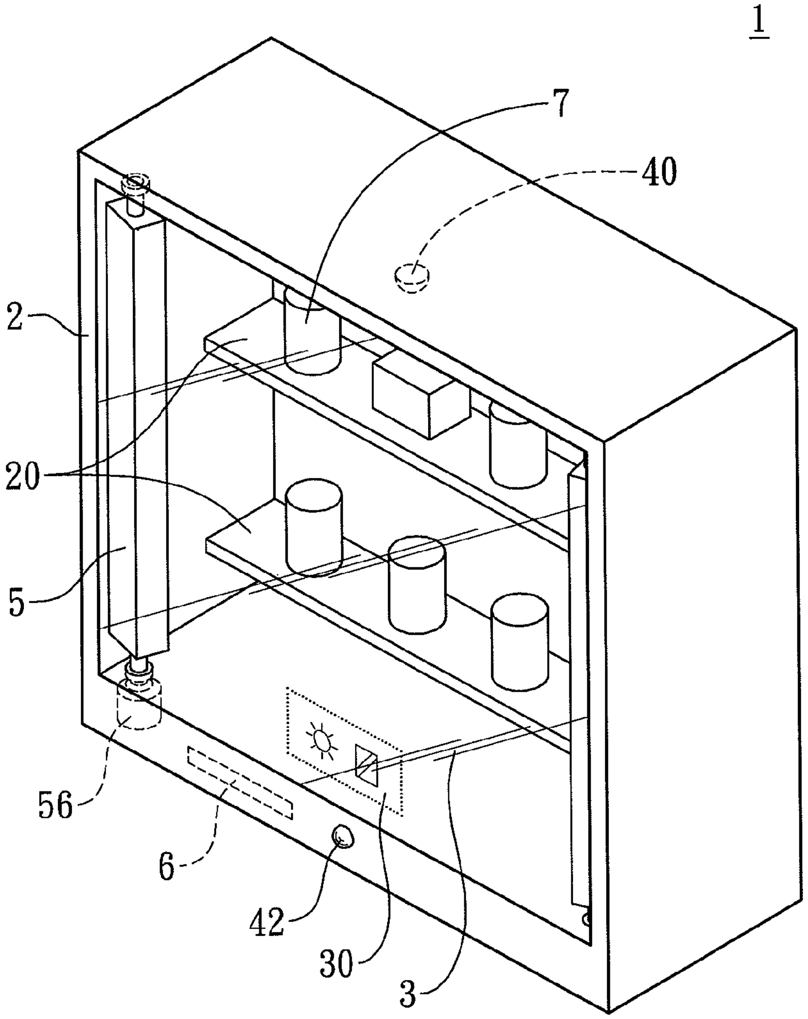
FIG. 1 is a perspective view of a first preferable embodiment of an interactive-type display window device of the present invention.

The present invention discloses an interactive-type display window device comprising at least one lighting module (rotatable or non-rotatable) together with sensor and/or transparent display panel (with or without a touch control area). Thereby, it is able to adjust the luminous intensity, luminous chromaticity, luminous color temperature, luminous frequency spectrum, and/or the rotation of the lighting module according to the detection results from the sensor or the customers' preference in order to obtain the optimal luminous design.

Please refer to FIGS. 1, 4, 6, and 8, which shows the first preferable embodiment of the interactive-type display window device. As shown in these figures, the interactive-type display window device 1 comprises a receiving unit 2, a transparent display panel 3, at least one sensor, two lighting modules 5, and a processing unit 6. In this embodiment, the lighting module 5 is rotatable.

The receiving unit 2 is a casing in which is disposed with at least one display shelf 20 for placing the display commodities 7 thereon. In this embodiment, two display shelves 20 are arranged vertically as an example. However, in implementation, three or more shelves can be arranged vertically. Alternatively, two or more shelves could be arranged on the same height to place two or more rows of display commodities thereon. These different kinds of arrangement are not beyond the scope of the present invention.

The transparent display panel 3 is provided on the front surface of the receiving unit 2 for displaying the information regarding the display commodities to the consumers. Besides, in this embodiment, the transparent display panel 3 is provided with a touch control area 30. Thereby, via this touch control area 30, consumers can control the display of the information (such as the information regarding the display commodities), adjust the luminous intensity, luminous chromaticity, luminous color temperature, and/or luminous frequency spectrum of the light source, and control the rotation of the lighting module 5.

The at least one sensor is at least one photo sensor and/or at least one proximity sensor and is provided on the receiving unit 2. In this embodiment, one photo sensor 40 is provided on the internal surface of the receiving unit 2 and one proximity sensor 42 is provided on the front external surface thereof. The photo sensor 40 is used to detect the lighting environment (such as the condition of light reflection) inside the receiving unit 2. The proximity sensor 42 is used to detect whether any consumer is approaching the receiving unit 2.

As for the photo sensor, in implementation, in addition to the photo sensor provided on the internal surface of the receiving unit 2, another photo sensor could be disposed on the external surface of the receiving unit 2 for detecting the external lighting environment (such as environmental luminous intensity or color temperature). Moreover, by installing photo sensors both on the internal and external surfaces of the receiving unit 2, it is able to provide more complete detection results regarding the lighting environment inside and outside the receiving unit.

Figure 4:
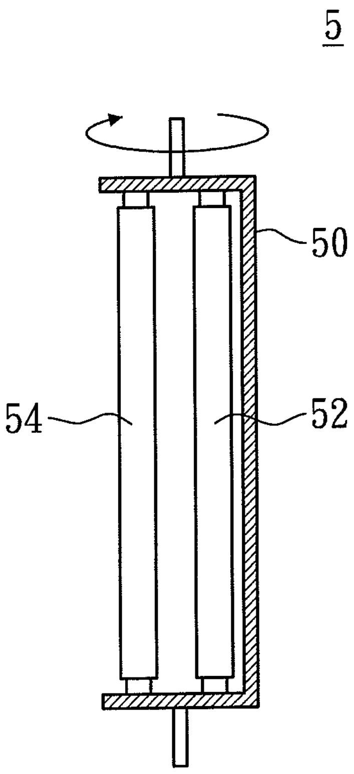
FIG. 4 is a cross-sectional view showing the lighting module in the first preferable embodiment of the interactive-type display window device of the present invention.

The lighting modules 5 are provided at two sides in the receiving unit 2 for emitting light onto the display commodities 7 on the display shelf 20. Please refer to FIG. 4, which shows the cross-sectional view of each lighting module 5. As shown in FIG. 4, each lighting module 5 includes a casing 50, a light source 52, and a light regulator 54.

In this case, the casing 50 is provided with a driving device 56 (such as a motor), by which it is rotatable. The light source 52 is fixed in the casing. The light regulator can be a lens, a cover, or a light control plate and is connected to the casing 50 for covering the light source 52.

Figure 8:
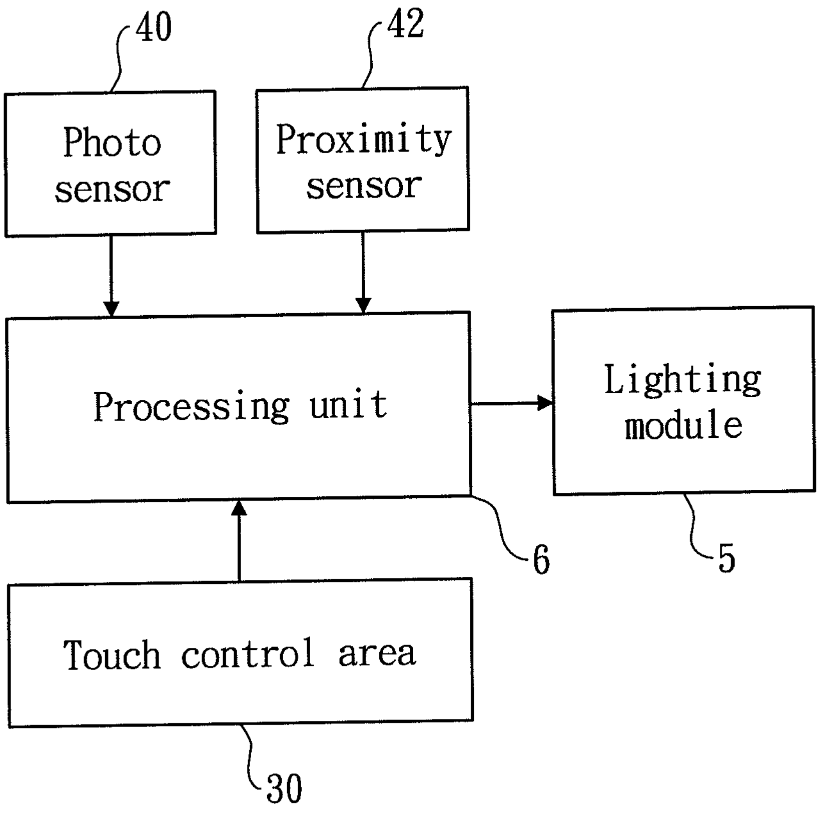
FIG. 8 is a block diagram showing the rotational control of the lighting module in the first preferable embodiment of the interactive-type display window device of the present invention.

The processing unit 6 is electrically connected with the photo sensor 40, the proximity sensor 42, and the two lighting modules 5. As shown in FIG. 8, the processing unit 6 is designed to receive the detection results from the photo sensor 40 and the proximity sensor 42 and analyze these detection results on the basis of the predetermined mechanism. Based on these detection results, the processing unit 6 is capable of adjusting automatically the luminous intensity, luminous chromaticity, luminous color temperature, and/or luminous frequency spectrum of the light source 52 in the lighting module 5 by changing the voltage provided to the light source 52. Moreover, on the basis of the detection results, the processing unit 6 is also capable of adjusting the rotation of the lighting module in order to alter the radiation angle of the light source. Thereby, both of the adjustments are able to optimize the luminous effect.

Figure 2:
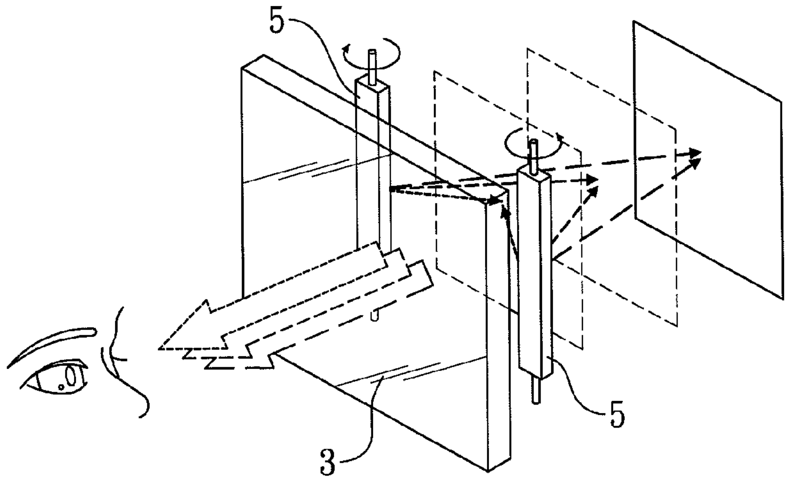
FIGS. 2~3 are schematic views showing the action of the lighting module in the interactive-type display window device of the present invention.
Figure 3:
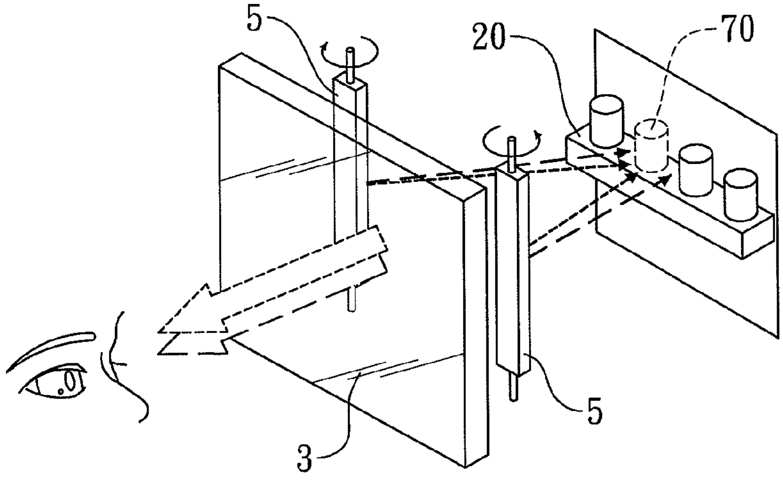

Please refer to FIGS. 2~3, which shows the control of the rotation of the lighting module. As shown in FIG. 2, three planes are illustrated in the receiving unit 2 to represent three different depths therein. By means of providing the left and the right lighting modules respectively with different angles of rotation, light could be emitted onto the planes with different depths. By this way, light could be emitted onto the display commodities placed in the position of the planes with different depths. Moreover, in order to achieve the optimal luminous effect, it is also capable of altering the focusing plane of the emitted light according to the specific kinds of the used transparent display panel or the specific requirements for use, such as according to the specific light transmission values.

Furthermore, as shown in FIG. 3, light could be emitted onto a certain commodity by means of the control of the rotation of the lighting module. When a certain display commodity 70 is removed to leave an empty space on the display shelf, it is capable of adjusting the rotation of the lighting module to have the light emitted onto another commodities on the display shelf rather than directed towards the empty space left by the removed commodity.

Figure 6:
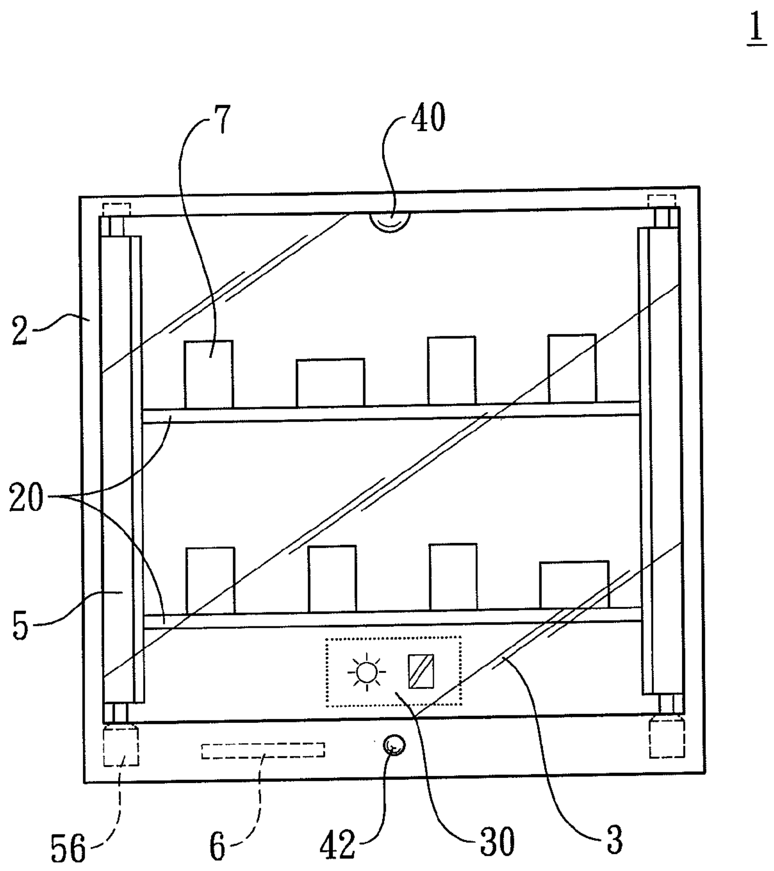
FIG. 6 is a frontal view of the first preferable embodiment of the interactive-type display window device of the present invention.

As mentioned above, the transparent display panel 3 is provided with a touch control area 30. Thereby, consumers can control the display of the information, such as choosing to display the information regarding a certain commodity or regarding the advertisement and promotion. Besides, via the touch control area, consumers are also capable of adjusting the luminous intensity, luminous chromaticity, luminous color temperature, and/or luminous frequency spectrum of the light source in the lighting module, or adjusting the rotation of the lighting module. In this embodiment, as shown in FIG. 6, two images present on the touch control area 30 respectively represent the light source control (left side) and commodity information (right side). Consumers can undertake the operation by touching the images present on the touch control area.

The control of the rotation of the lighting module 5 is taken as an example as shown in FIG. 8. Consumers can input control commands via the touch control area 30 to adjust the rotation of the lighting module via the processing unit 6 in order to obtain the optimal luminous effect for the consumers.

Alternatively, in implementation, the receiving unit 2 also can be provided with a control panel on its external surface to replace the use of the touch control area. In this way, via this control panel, consumers also can control the information displayed on the transparent display panel, the luminous intensity, luminous chromaticity, luminous color temperature, and/or luminous frequency spectrum of the light source in the lighting module, or the rotation of the lighting module.

Above-mentioned description regarding the touch control for the light source control and the commodity information is just exemplary. In implementation, the interactive-type display window device also can be in connection with Internet and via the touch control area consumers can transmit or receive data in order to perform various functions, such as sending feedback comments, settling orders, or undertaking Internet-based payment procedures (via credit cards or other means).

Figure 5:
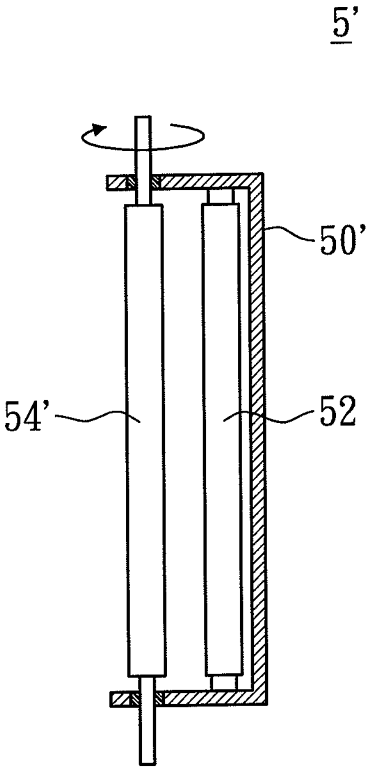
FIG. 5 is a cross-sectional view showing the lighting module in a second preferable embodiment of the interactive-type display window device of the present invention.
Figure 7:
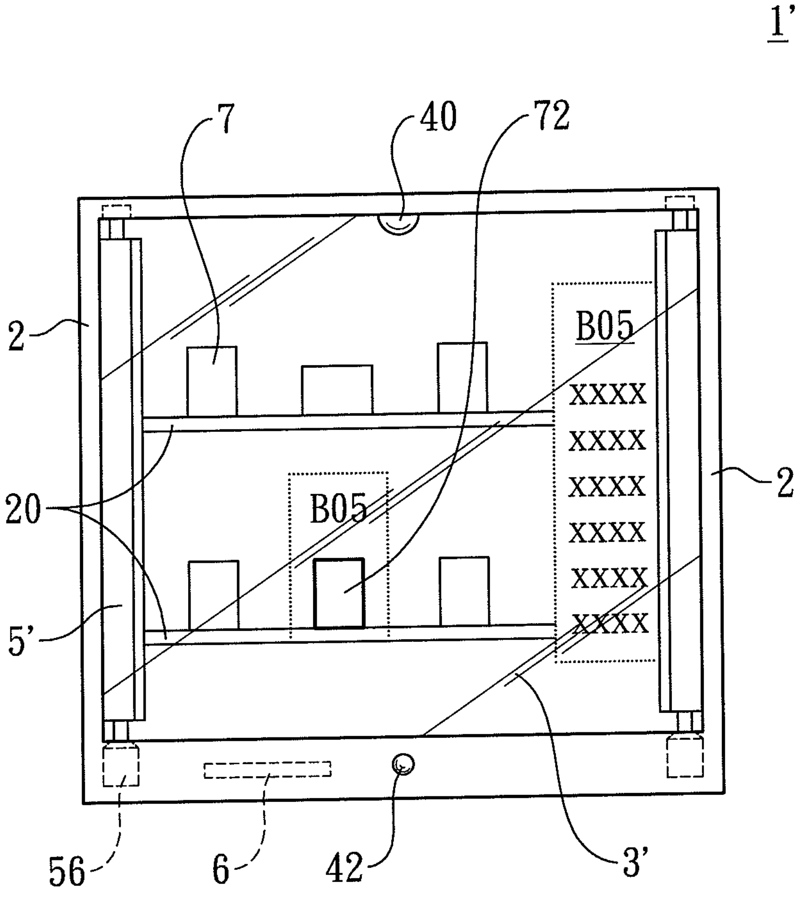
FIG. 7 shows the use of the interactive-type display window device in the second preferable embodiment of the present invention.

Please refer to FIGS. 5 and 7, which shows the second preferable embodiment of the interactive-type display window device of the present invention. As shown in these figures, the second preferable embodiment is different from the first preferable embodiment in two aspects: the structural design of the lighting module and the specific type of the light-pervious panel provided on the front surface of the receiving unit.

As for the structure of the lighting module 5' in the second preferable embodiment, as shown in FIG. 5, each lighting module 5' includes a casing 50', a light source 52, and a light regulator 54'. In this case, the casing 50' is fixed in the receiving unit 2. The light source 52 is fixedly located in the casing 50'. The light regulator 54' is connected to the casing 50' and is rotatable under the control of the processing unit 6.

In this embodiment, the processing unit 6 controls the rotation of the light regulator 54' via a driving device 56 (such as a motor). By controlling the rotation of the light regulator 54', it is able to change the relative position of the light regulator 54' with respect to the light source 50 in the casing 50' and consequently alter the light traveling path. Thereby, the luminous design in the receiving unit 2 can be altered automatically or according to the consumers' preference in order to obtain the optimal luminous design.

Moreover, in this embodiment, the light-pervious panel provided on the front surface of the receiving unit 2 is a touch display panel. In other words, the whole area of the touch display panel can be used for touch control. Referring to FIG. 7, the display commodity 72 is taken as an example. When a consumer is approaching, the name of the display commodity 72 "B05" is displayed above the area of the touch display panel corresponding to the display commodity 72. If the consumer wants to know more above the display commodity, the information regarding the display commodity 72 will be displayed on the touch display panel if the consumer presses the area on which the name is shown.

The above-mentioned description regarding the touch control is just exemplary. In implementation, in addition to controlling the display of the information regarding the display commodities, the touch control area also can be used to adjust the luminous intensity, luminous chromaticity, luminous color temperature, and/or luminous frequency spectrum of the light source in the lighting module, or the rotation angle of the light regulator.

As disclosed in above descriptions and attached drawings, the present invention provides an interactive display window device provided with at least one sensor and/or transparent display panel (with or without touch control area). Thereby, it is able to adjust the luminous intensity, luminous chromaticity, luminous color temperature, luminous frequency spectrum, and/or the rotation of the lighting module according to the detection results from the sensor or the preference of the consumers, and is able to display the information regarding the display commodities to consumers in order to achieve the purposes of advertisement and promotion. It is new and can be put into industrial use.

Although the embodiments of the present invention have been described in detail, many modifications and variations may be made by those skilled in the art from the teachings disclosed hereinabove. Therefore, it should be understood that any modification and variation equivalent to the spirit of the present invention be regarded to fall into the scope defined by the appended claims.

What is claimed is:

1. An interactive-type display window device, comprising:

a receiving unit, provided with at least one display shelf for placing display commodities thereon;

a light-pervious panel, provided on a front surface of the receiving unit;

at least one sensor, which is at least one photo sensor and/or at least one proximity sensor, where each photo sensor is used to detect the lighting environment inside or outside the receiving unit, while each proximity sensor is used to detect whether any consumer is approaching the receiving unit;

at least one lighting module, provided within the receiving unit for emitting light onto the display commodities on the at least one display shelf; and a processing unit, electrically connected with the at least one sensor and the at least one lighting module for receiving the detection results from the sensor and adjusting the luminous intensity, luminous chromaticity, luminous color temperature, and/or luminous frequency spectrum of the light source in the lighting module according to the detection results.

2. The interactive-type display window device as claimed in claim 1, wherein the lighting module is rotatable, and the processing unit is capable of controlling the rotation of the lighting module according to the detection results in order to alter the radiation angle of the light source.

3. The interactive-type display window device as claimed in claim 2, wherein the light-pervious panel is a transparent display panel for displaying information regarding the display commodities.

4. The interactive-type display window device as claimed in claim 3, wherein the transparent display panel is provided with a touch control area and the touch control area is used for consumers to control the information display and/or to control the processing unit to adjust the rotation of the lighting module and/or the luminous intensity, luminous chromaticity, luminous color temperature, and/or luminous frequency spectrum of the light source therein.

5. The interactive-type display window device as claimed in claim 2, wherein each lighting module includes:

a casing, rotatable under the control of the processing unit;

a light source, provided in the casing; and a light regulator, connected to the casing for covering the light source.

6. The interactive-type display window device as claimed in claim 5, wherein the light regulator is a lens, a covering, or a light control plate.

7. The interactive-type display window device as claimed in claim 2, wherein each lighting module includes:

a casing, fixed in the receiving unit;

a light source, provided in the casing; and a light regulator, connected to the casing for covering the light source and rotatable under the control of the processing unit.

8. The interactive-type display window device as claimed in claim 7, wherein the light regulator is a lens, a covering, or a light control plate.

9. An interactive-type display window device, comprising:

a receiving unit, provided with at least one display shelf for placing display commodities thereon;

a transparent display panel, provided on a front surface of the receiving unit for displaying information regarding the display commodities and provided with a touch control area;

at least one lighting module, provided within the receiving unit for emitting light onto the display commodities on the at least one display shelf; and a processing unit, for adjusting the luminous intensity, luminous chromaticity, luminous color temperature, and/or luminous frequency spectrum of the light source in the lighting module;

wherein the touch control area is used for consumers to control the information display and/or to control the processing unit to adjust the luminous intensity, luminous chromaticity, luminous color temperature, and/or luminous frequency spectrum of the light source therein.

10. The interactive-type display window device as claimed in claim 9, wherein the lighting module is rotatable, and the processing unit is capable of controlling the rotation of the lighting module according to the touch control of the consumers in order to alter the radiation angle of the light source.

11. The interactive-type display window device as claimed in claim 10, wherein each lighting module includes:

a casing, rotatable under the control of the processing unit;

a light source, provided in the casing; and a light regulator, connected to the casing for covering the light source.

12. The interactive-type display window device as claimed in claim 11, wherein the light regulator is a lens, a covering, or a light control plate.

13. The interactive-type display window device as claimed in claim 10, wherein each lighting module includes:

a casing, fixed in the receiving unit;

a light source, provided in the casing; and a light regulator, connected to the casing for covering the light source and rotatable under the control of the processing unit.

14. The interactive-type display window device as claimed in claim 13, wherein the light regulator is a lens, a covering, or a light control plate.

15. The interactive-type display window device as claimed in claim 9 further comprising at least one photo sensor, wherein the photo sensor is provided on the receiving unit for detecting the lighting environment inside or outside the receiving unit; and the processing unit is connected with the at least one photo sensor for adjusting the rotation of the lighting module and/or the luminous intensity, luminous chromaticity, luminous color temperature, and/or luminous frequency spectrum of the light source therein according to the detection results of the photo sensor.

16. The interactive-type display window device as claimed in claim 9 further comprising at least one proximity sensor, wherein the proximity sensor is provided on the receiving unit for detecting whether any consumer is approaching the receiving unit; and the processing unit is connecting with the at least one proximity sensor for adjusting the rotation of the lighting module and/or the luminous intensity, luminous chromaticity, luminous color temperature, and/or luminous frequency spectrum of the light source therein according to the detection results of the proximity sensor.

* * * * *